(12) United States Patent
Boyer

(10) Patent No.: US 6,312,001 B1
(45) Date of Patent: Nov. 6, 2001

(54) MOTIVE VEHICLE

(76) Inventor: Robert W. Boyer, 759 W. 28th St. South, Newton, IA (US) 50208

( * ) Notice: Subject to any disclaimer, the term of this patent is extended or adjusted under 35 U.S.C. 154(b) by 0 days.

(21) Appl. No.: 09/667,969

(22) Filed: Sep. 22, 2000

Related U.S. Application Data

(62) Division of application No. 09/231,603, filed on Jan. 14, 1999, now abandoned.

(51) Int. Cl.[7] .............................. B62K 3/12; B62K 3/00
(52) U.S. Cl. ......................... 280/282; 280/204; 280/231
(58) Field of Search .................................. 280/282, 262, 280/288.1, 259, 260, 261, 238, 230, 231, 204

(56) References Cited

PUBLICATIONS

Bike Along, 7334 Hollister Avenue, Goleta, CA 39117 (Complete data base of bike products which includes 1997 and 1998 models, printout on Jul. 27, 1998.

Bike Along, 7334 Hollister Avenue, Goleta, CA 39117 (Complete data base of bike products) CD Catalog available at least from Oct. 2000, printout from pp. 10–19.

*Primary Examiner*—Robert P. Olszewski
*Assistant Examiner*—Andrew J. Fischer
(74) *Attorney, Agent, or Firm*—Zarley, McKee, Thomte, Voorhees & Sease

(57) ABSTRACT

A motive vehicle comprises a frame, a front wheel, two rear wheels, a seat, a handle, a headset, and a pedal device. A front sprocket is coupled to the pedal device and a rear sprocket is connected to a differential. The motive vehicle is powered by human pedaling. The differential communicates with the rear wheels to allow the vehicle to turn on a zero turn radius. The wheels are attached to the frame with an attachment apparatus that allows for easy detachability. The seat is also detachable and adjustable. Brake cams are attached to the frame, and engage the rear wheels when the bike is pedaled backwards. An alternative embodiment comprises a multiple operator motive vehicle, wherein a rear vehicle with two wheels is coupled to a front vehicle having three wheels. Further, another two-wheeled follower unit may be coupled to the first rear vehicle for a greater number of riders. Additional attachments may also be made.

7 Claims, 8 Drawing Sheets

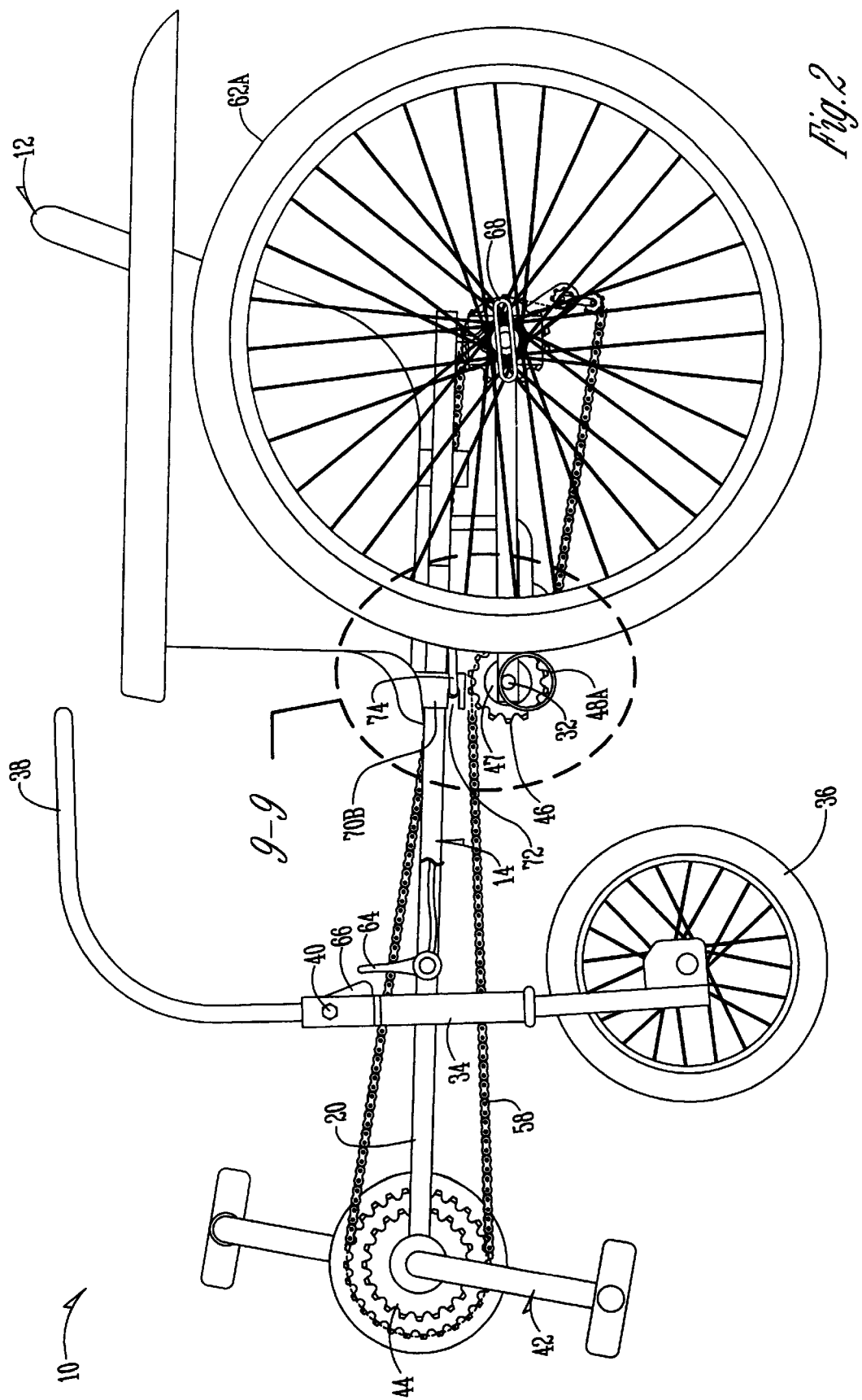

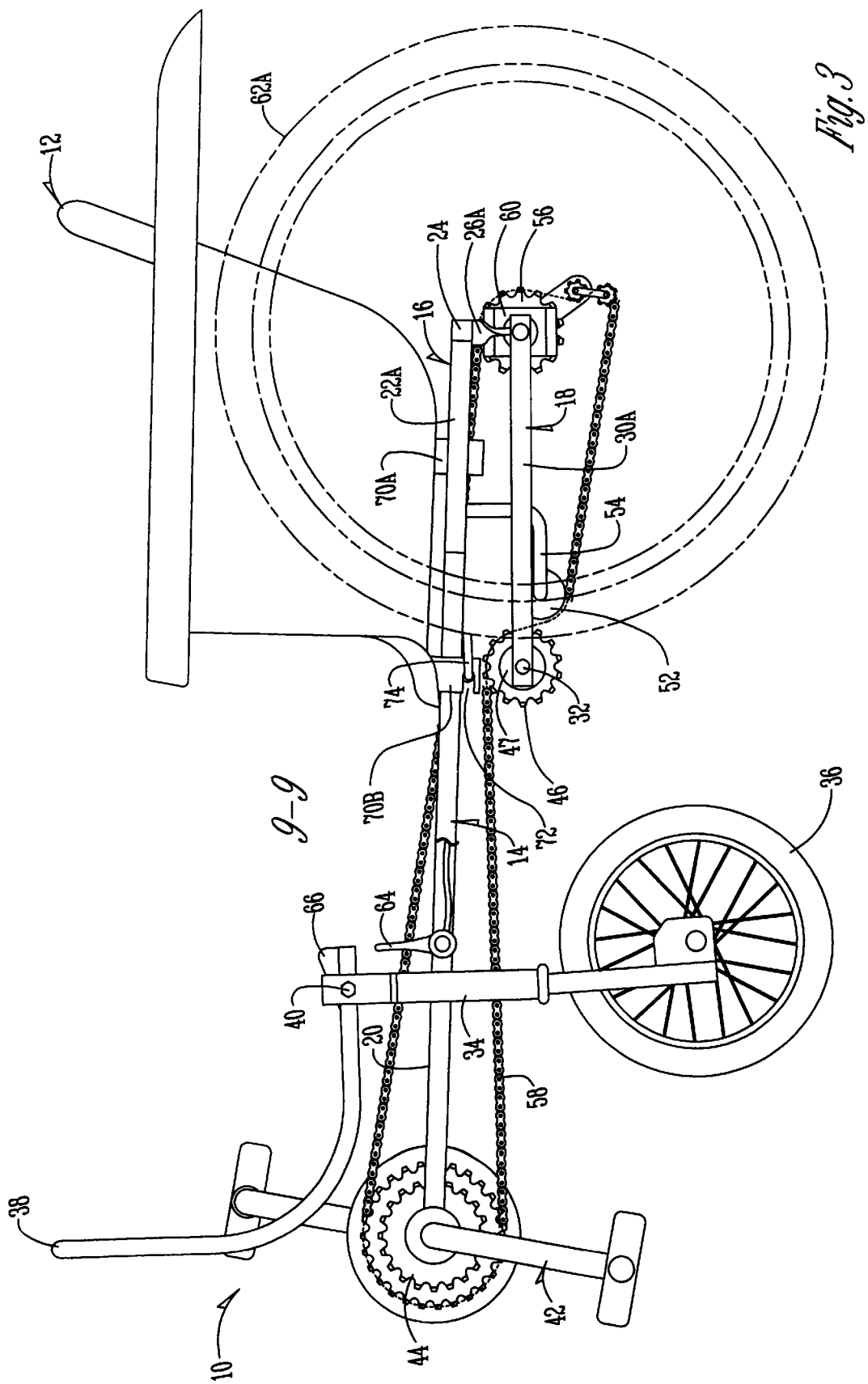

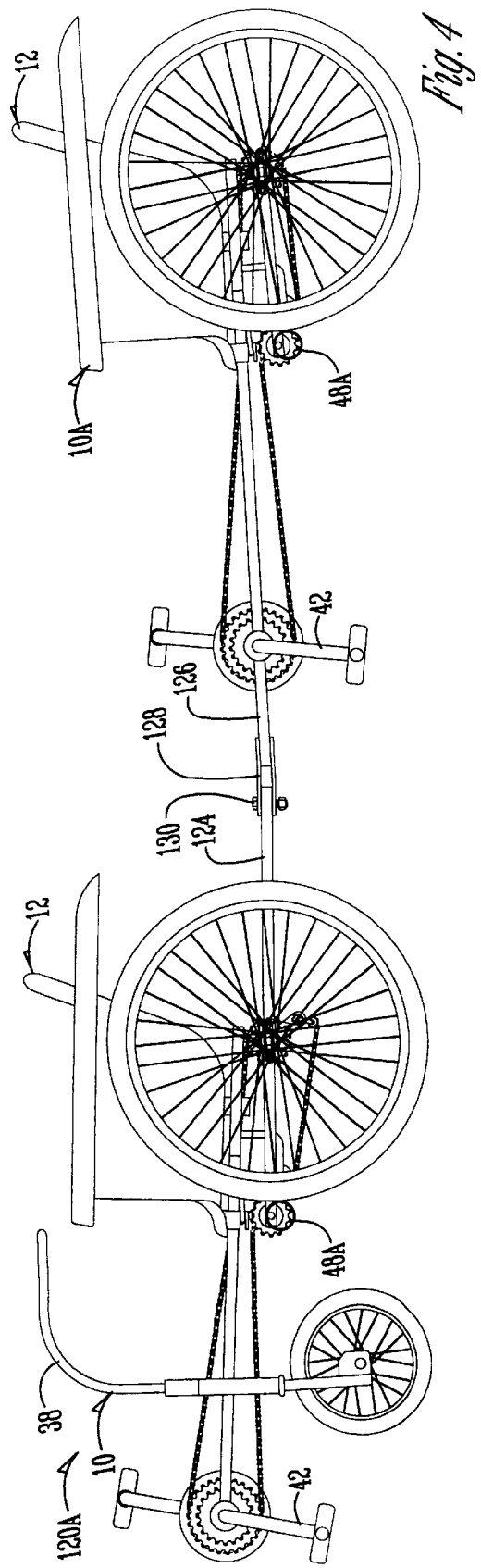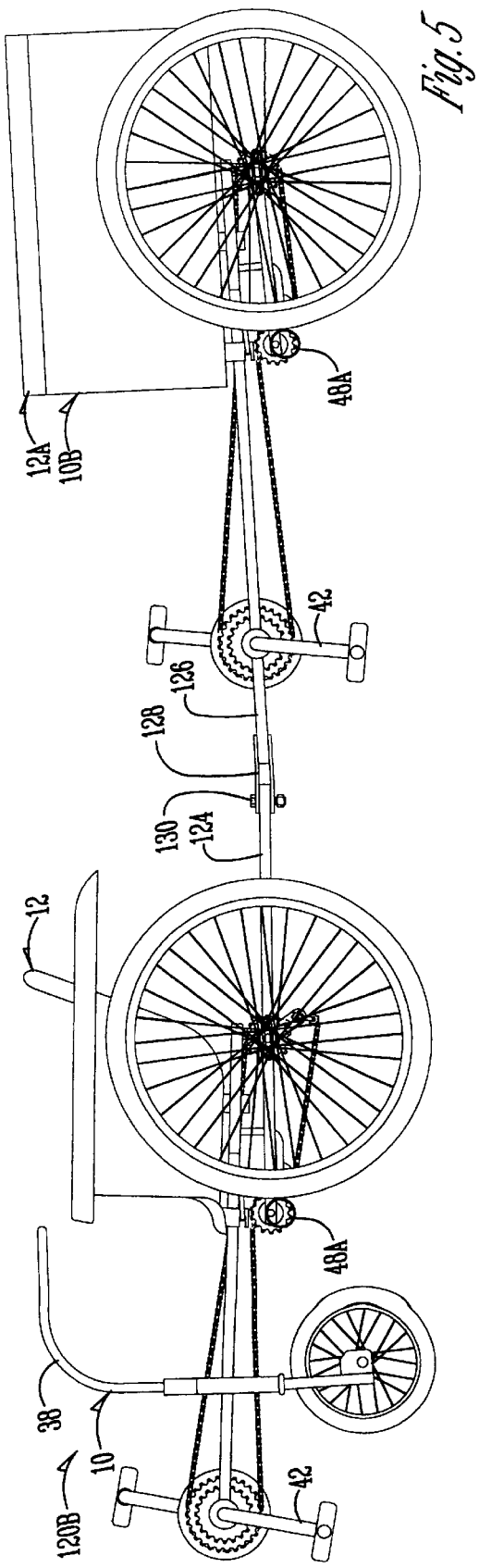

MOTIVE VEHICLE

"This application is a continuation of related application U.S. Ser. No. 09/231,603 filed on Jan. 14, 1999 now abandoned."

BACKGROUND OF THE INVENTION

A. Field of the Invention

The present invention relates to motive vehicles that are propelled by human force through a pedaling motion. More specifically, the present invention relates to a three wheel single person vehicle. This invention allows a user to turn the vehicle on a zero turn radius and to easily detach the wheels and seat. A number of secondary units can be attached to the three wheel vehicle to allow more than one person to be transported.

B. Problems in the Art

Motive vehicles that are powered by humans, through the use of pedals, are well known in the art. Both single person three-wheel vehicles and multiple user vehicles are old. However, these prior art motive vehicles suffered from a variety of defects. Some of these vehicles were hard to maneuver, making turns around tight corners very difficult. Other vehicles had wheels that were hard to remove. When these vehicles would blow a tire or need to be transported in a car, an operator would have to spend a long time taking the wheels off. Other prior art vehicles had uncomfortable seats that were difficult or impossible to remove. This also made storing the vehicle in a tight space a difficult task. Still other vehicles suffered from faulty or unreliable braking systems.

Therefore, a principal object of the present invention is to provide a motive vehicle that improves upon or solves problems and deficiencies in the art.

Another object of the present invention is to provide a motive vehicle with a zero turn radius.

A further object of the present invention is to provide a motive vehicle that has wheels that are easily detachable.

A still further object of the present invention is to provide a motive vehicle that has a braking system that is easy to use and reliable.

Yet another object of the present invention is to provide a motive vehicle that has a detachable seat.

Another object of the present invention is to provide a two-person motive vehicle that is easy to use.

A further object of the present invention is to provide a motive vehicle that is durable, efficient in operation, easy to use, and economical.

These and other features, objects, and advantages of the present invention will become apparent to those skilled in the art through reference to the specification, claims, and accompanying drawings.

SUMMARY OF THE INVENTION

A motive vehicle according to the present invention comprises a central frame, rear wheels attached to the central frame, and a seat attached to the central frame. Both the seat and rear wheels may be detachable. A pedal device and a fork are operatively attached to the central frame. A handle and a front wheel are connected to the fork. The front wheel, fork, and handle allow for steering of the motive vehicle. A differential is operatively coupled to the central frame. A front gear is coupled to the pedal device and a rear gear is connected to the differential. A chain is operatively coupled to both the front and rear sprockets. Force applied to the pedal device propels the vehicle in a forward motion.

The differential communicates with the rear wheels. The differential allows the wheel on the side to which the operator is turning to quit rotating. This gives the motive vehicle a zero turn radius.

Preferably, another gear and a one-way clutch are coupled to the central frame, along with brake cams. Backwards pedaling will cause the brake cams to frictionally engage the rear wheels, helping them to slow down.

In an alternative embodiment, a front motive vehicle having three wheels is connected to a rear vehicle which has two wheels. The front vehicle is of the type just described. The rear vehicle will also have a seat and a pedal device similar to that on the front vehicle. Two people can operate this tandem vehicle.

BRIEF DESCRIPTION OF THE DRAWINGS

FIG. 2 is a side elevation view of the motive vehicle of FIG. 1, shown with the seat and wheels attached.

FIG. 3 is a side elevation view of the invention of FIG. 1, with the wheels removed and the handle in a second position.

FIG. 4 is a side elevation view of a second embodiment of the present invention.

FIG. 5 is a side elevation view of the second embodiment, wherein the rear vehicle has a trailer, instead of a seat.

DETAILED DESCRIPTION OF THE PREFERRED EMBODIMENT

Figure 1:
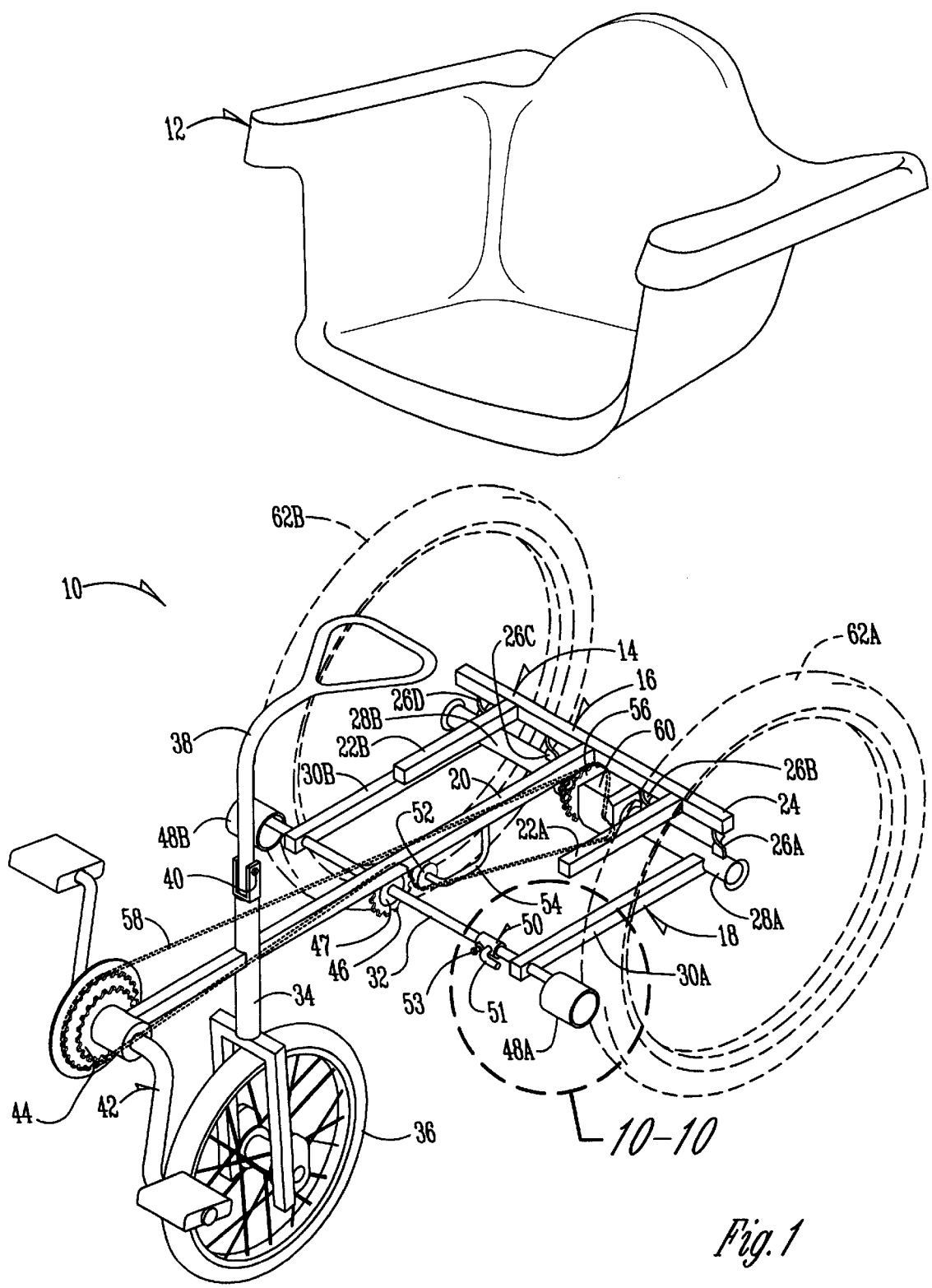
FIG. 1 is a perspective view of a preferred embodiment of the motive vehicle of the present invention, shown with the wheels and seat removed.

To provide a better understanding of the invention, one preferred embodiment of the invention will now be described in detail. It is to be understood that the preferred embodiment discussed below is but one form the invention can take and is not exclusive. The description will make frequent references to the accompanying drawings. Reference numerals and/or letters will be utilized to indicate certain parts or locations in the drawings. The same reference numbers and/or letters will be used to indicate the same parts or locations in all of the drawings unless otherwise indicated.

A preferred embodiment of a motive vehicle according to the present invention is generally referenced by the numeral 10. The motive vehicle 10 has a seat 12 which is connected to a central frame 14. The seat 12 is detachable and is shaped so that a plurality of seats can be stacked upon one another. The seat 12 is also molded from material such as fiberglass to be more comfortable than a customary bicycle seat.

The central frame 14 is comprised of a top frame 16 and a bottom frame 18. The top frame 16 comprises a longitudinal bar 20, support bars 22A, 22B and transverse bar 24. The longitudinal bar 20 is connected to the transverse bar 24, and the support bars 22A, 22B are connected to the transverse bar 24. The seat 12 has connection members 70A, 70B (FIG. 3) which matingly slide over the longitudinal bar 20. Pin 74 has a cam 73 (FIG. 9) that fits into the groove 72 of the connection member 70B. The cam 73 frictionally engages the longitudinal bar 20 to prevent the seat 12 from sliding, when the pin 74 is in the position shown in FIGS. 2 and 3. When the cam 73 engages the bar 20, pin 74 is held in a notch in groove 72. The pin 74 can be rotated and removed to allow the seat 12 to be detached. The support bars 22A, 22B serve to add support and stability to the seat 12. A chain tightener 52 is attached to the longitudinal bar 20 by the connection arm 54. The chain tightener 54 serves to take slack out of the chain 58, and engage sprocket 46.

The top frame 16 is connected to the bottom frame 18 through connection members 26A–26D. The bottom frame 18 comprises two longitudinal bars 30A, 30B, a transverse rod 32, and connection cylinders 28A, 28B. The transverse rod 32 is operatively coupled to both longitudinal bars 30A, 30B. A one way clutch 47 is connected to the transverse rod 32. A middle gear 46 is operatively coupled with the one way clutch 47. Connection cylinder 28A is connected to longitudinal bar 30A, and connection cylinder 28B is connected to longitudinal bar 30B. Connection members 26A and 26B connect cylinder 28A to transverse bar 24. Connection members 26C and 26D connect cylinder 28B to transverse bar 24. A differential 60 is operatively coupled to the connection cylinders 28A, 28B. A rear sprocket 56 is connected to the differential 60. The rear wheels 62A, 62B are connected to connection cylinders 28A, 28B, respectively. The rear wheels 62A, 62B are detachable.

A headset 34 is rotatably coupled to the longitudinal bar 20. A standard bicycle headset can be used. A front wheel 36 is connected to the headset 34. A handle 38 is connected to the headset 34 through pivotal attachment 40. The combination of the headset 34, handle 38, and front wheel 36 allows an operator to steer the motive vehicle 10. The pivotal connection 40 allows the handle 38 to be moved from an initial position (FIG. 2) to a second position (FIG. 3). The handle 38 position shown in FIG. 3 would be suitable when an operator decided to pull the motive vehicle 10. Lock 66 serves to keep the handle from pivoting after a position for the handle 38 has been selected. The pivotal connection 40 also makes it easier for an operator to get in and out of the seat 12.

A pedal device 42 is attached to the longitudinal bar 20. A front sprocket 44 is operatively connected to the pedal device 42. The front sprocket 44 and the pedal device 42 are conventional in the art. A chain 58 is operatively coupled to the front gear 44, the rear gear 56, the chain tightener 52, and the middle gear 46. The motive vehicle 10 is powered by the pedal device 42 which causes the chain 58 to rotate about the sprockets 44, 56, 46 and the chain tightener 52. The gear shifter 64 is attached to the longitudinal bar 20. The gear shifter 64 is also conventional.

Figure 6:
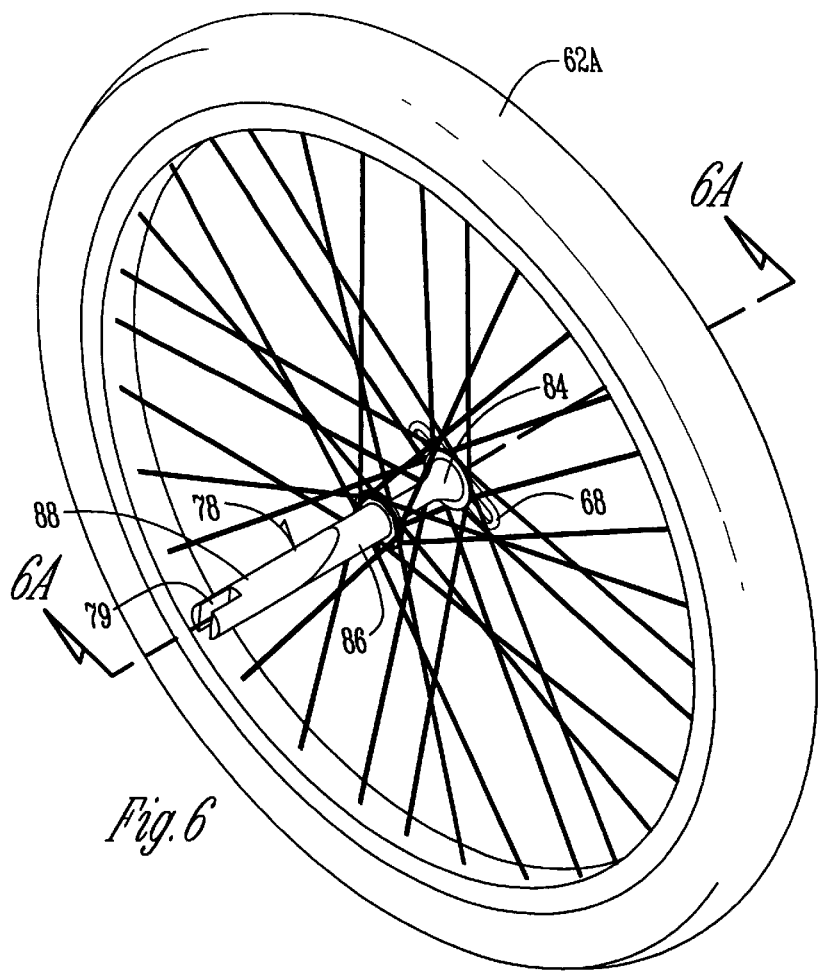
FIG. 6 is a perspective view of a wheel and attachment cylinder that are utilized with the present invention.
Figure 6A:
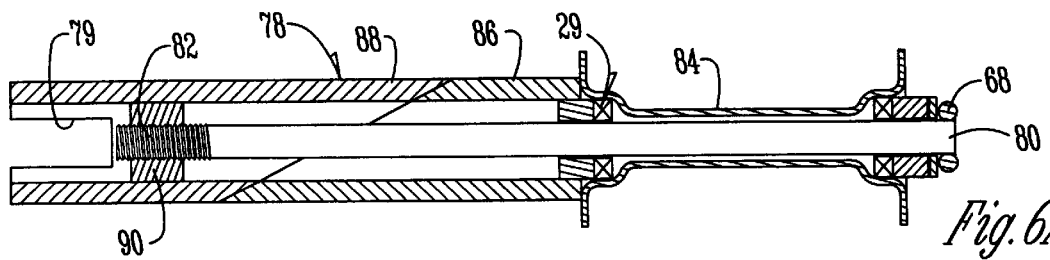
FIG. 6A is a sectional view taken along line 6A of FIG. 6.
Figure 6B:
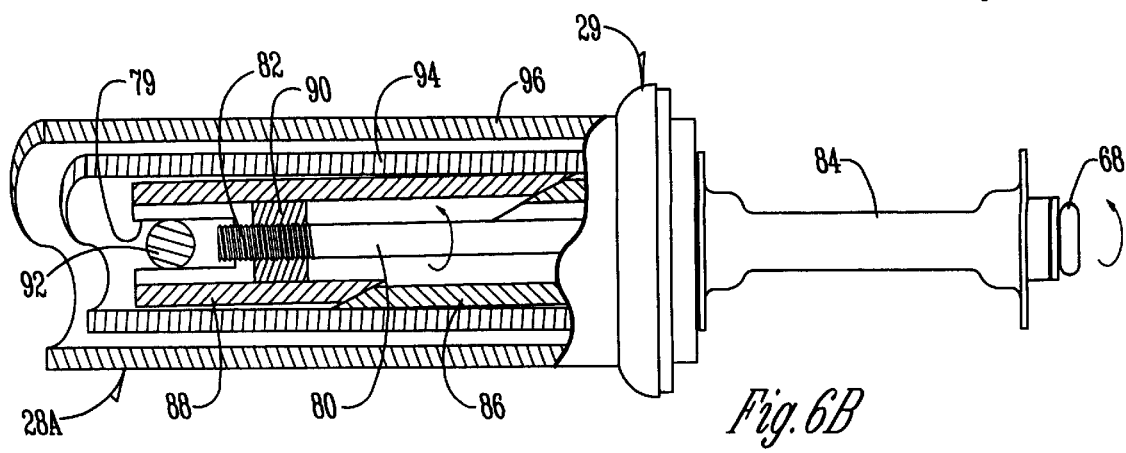
FIG. 6B is a sectional view similar to FIG. 6A, wherein the connection cylinder is attached to the wheel

The detachability of the rear wheels 62A, 62B and the functioning of the connection cylinders 28A, 28B are best understood by reference to FIGS. 6, 6A, and 6B. FIG. 6 shows the attachment apparatus 78 of the rear wheel 62A.

The attachment apparatus 78 is comprised of quick release 88, coupling 86, and rod 80. The rod 80 has a threaded end 82. The rod 80 slides through the hub 84 of the rear wheel 62A. The coupling 86 is attached to the hub 84. This may be accomplished by welding or the like. The rod 80 slides through coupling 86 and quick release 88 until it comes into contact with the threaded part 90 of quick release 88. Turning the wheel tightener 68 will screw the threaded end 82 of rod 80 into the threaded part 90 of quick release 88. Once the respective parts of the attachment apparatus 78 are in the position shown in FIGS. 6 and 6A, the attachment apparatus 78 is inserted into the connection cylinder 28A.

The connection cylinder 28A into which the attachment apparatus 78 is inserted is comprised of two cylinders 94, 96. The inner cylinder 94 has a rod 92 that runs across the diameter and through the inner cylinder 94. The attachment apparatus 78 is inserted into the cylinder 94 to engage rod 92. The wheel tightener 68 is then turned to screw rod 80 further into quick release 88. The tightening of the screw will cause quick release 88 to "slide" up coupling 86, leading to the arrangement show in FIG. 6B. The tightening of the screw causes the attachment apparatus 78 to clamp down on the rod 92.

The two cylinder configuration of the connection cylinder 28A allows the wheel 62A to rotate even though the connection cylinder 28A is connected to the transverse bar 24 (FIG. 1). Inner cylinder 94 will rotate as the wheel 62A rotates, as a result of the attachment apparatus 78 being coupled to the rod 92. The outer cylinder 96 will not rotate.

Figure 7:
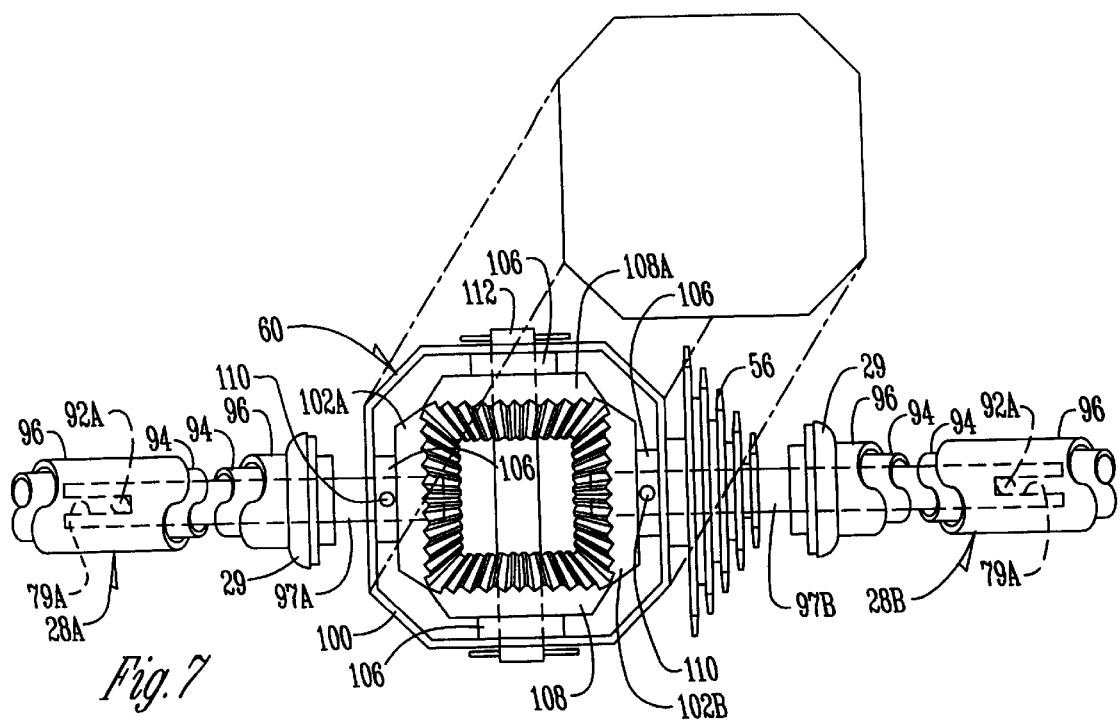
FIG. 7 is a rear elevation view of the differential that is utilized by the motive vehicle, shown with a five speed rear sprocket.
Figure 8:
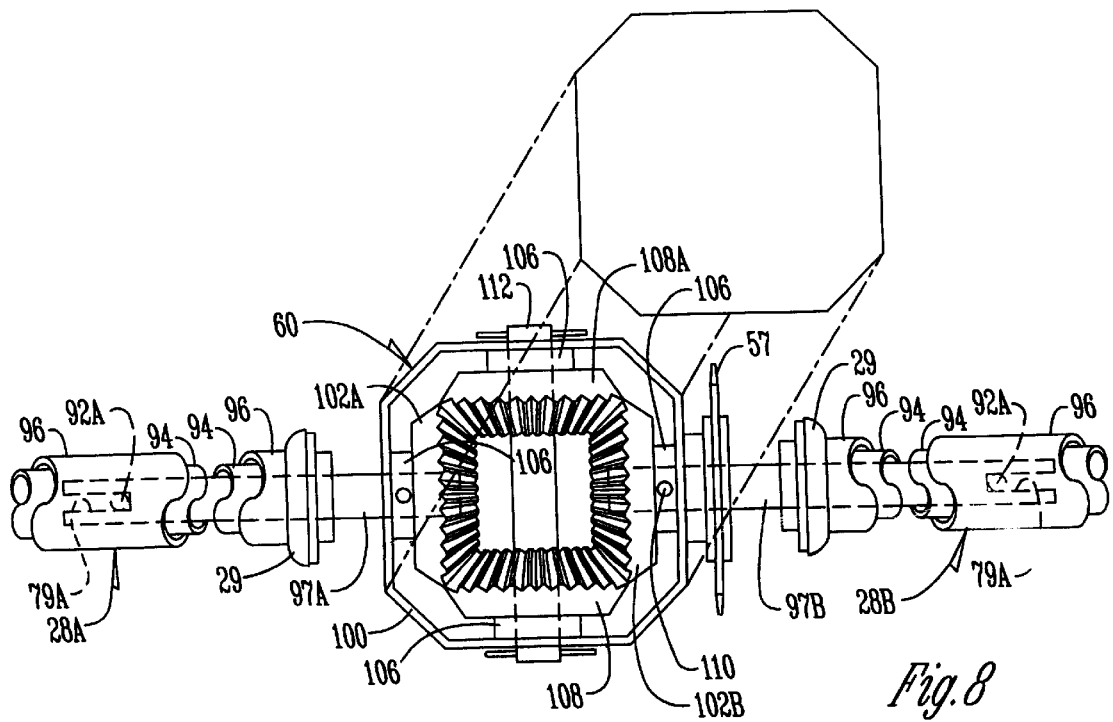
FIG. 8 is a rear elevation view of the differential that is utilized by the motive vehicle, shown with a one speed rear sprocket.

The functioning of the differential can best be understood by reference to FIGS. 7 and 8. The differential 60 comprises a housing 100 and four gears 102A, 102B, 104A, 104B. Two of the gears 102A, 102B are vertically disposed, and two 104A, 104B are horizontally disposed. Each gear has a neck 106 and a head with toothed gears 108. The gears have a hole that runs through their neck 106 and head 108. The vertically disposed gears 102A, 102B are connected to the connection cylinders 28A, 28B by pins that are inserted into holes 110 in the gears. The shafts 97A, 97B of the connection cylinders 28A, 28B have holes that communicate with the holes 110 of the vertical gears 102A, 102B and receive the pins that are inserted in holes 110. Pin 112 runs through the holes in the horizontally disposed gears 104A, 104B. The shafts 97A, 97B of the connections cylinders 28A, 28B frictionally engage the inner cylinders 94. A bearing 29 is position between the inner 94 and outer cylinders 96, making it easier for the inner cylinder 94 to rotate. The shafts 97A, 97B also have forked ends 79A that engage rods 92A. The rods 92A run through the inner cylinders 94. The rear sprocket 56 or 57 is screwed onto the housing 100 of the differential 60.

When the motive vehicle 10 is pedaled in a forward direction, the shafts 97A, 97B of the connection cylinders 28A, 28B rotate as a result of the rotation of the wheels 62A, 62B (FIG. 1). The housing 100 of the differential 60 will rotate due to the rotation of the rear sprocket 56 or 57 that is screwed to it. The vertical gears 102A, 10B rotate with the shafts 97A, 97B that they are coupled to. Even though the vertical gears 102A, 102B rotate, their position with respect to each other, the horizontal gears 104A, 104B and the housing 100 will remain constant.

As the motive vehicle 10 is turned, the rotation of the wheel on the side to which the operator is turning slows down relative to the other wheel. For example, if an operator made a right hand turn, the rotation of wheel 62B would be slower than the rotation of wheel 62A. The faster rotation of wheel 62A causes shaft 97A to rotate faster than shaft 97B, causing the horizontal gears 104A, 104B to rotate. The difference in the rate of rotation of the rear wheels is compensated for by the spinning of the housing 100. For a right turn with a zero turn radius, the right wheel 62B would stop rotating.

Figure 9:
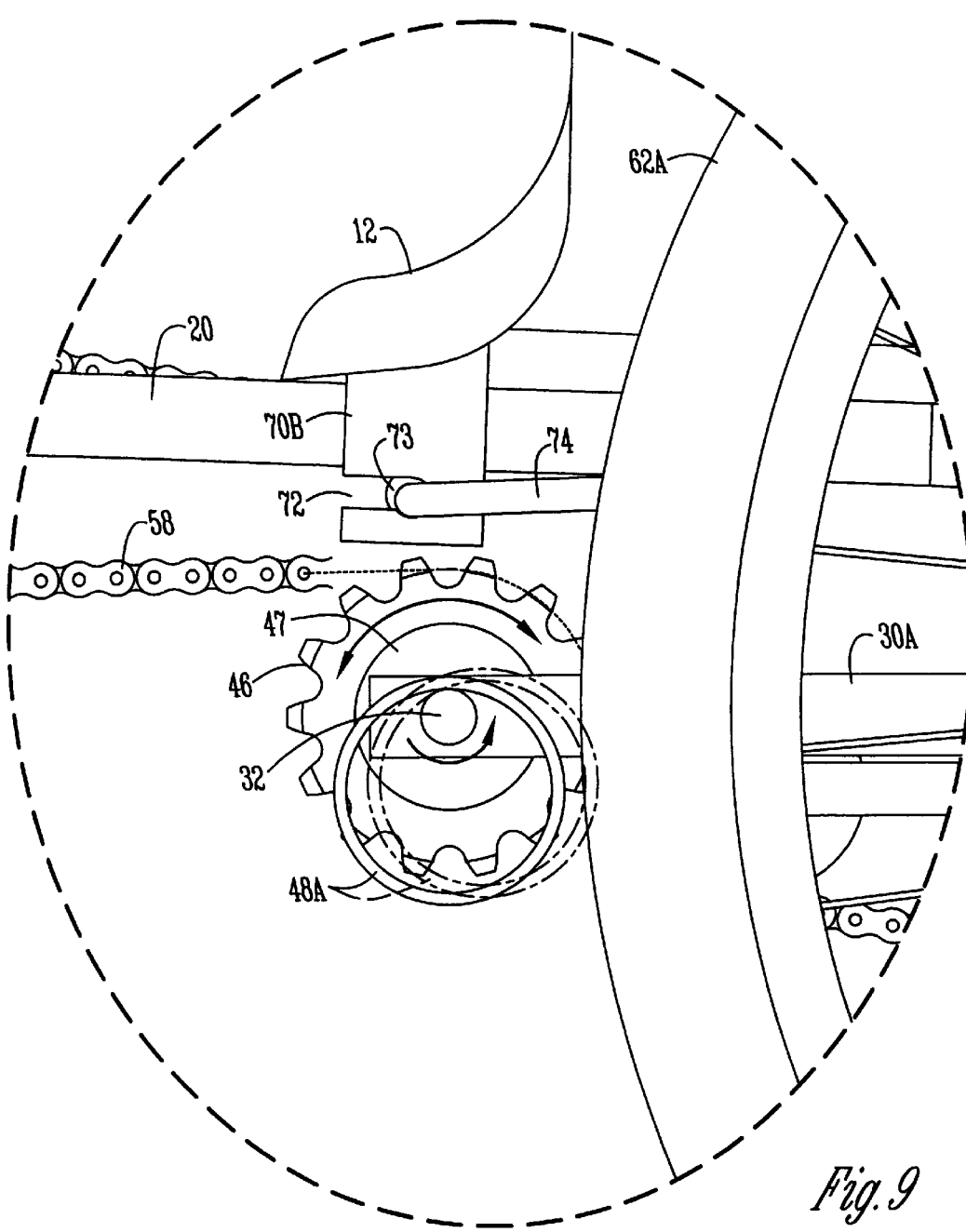
FIG. 9 is an enlarged side view, taken along circle 9—9 of FIG. 2, of a brake cam and clutch that are utilized in the present invention.

The operation of the motive vehicle's braking system is best shown in FIG. 9. The middle sprocket 46, the one way clutch 47 that is coupled to the transverse rod 32, and the brake cams 48A, 48B enable the operator of the motive vehicle 10 to come to a smooth stop. When the motive vehicle 10 is pedaled in a forward direction, the movement of the chain 58 will cause the middle sprocket 46 to rotate about the transverse rod 32 in a clockwise direction. The transverse rod 32 and the one way clutch 47 do not rotate when the motive apparatus 10 is pedaled in a forward direction. The brake cams 48A, 48B do not contact the wheels 62A, 62B when the motive vehicle 10 is pedaled forward.

As the motive vehicle 10 is pedaled backwards, chain 58 will cause the middle sprocket 46 to rotate in a counter-clockwise direction. The counter-clockwise rotation of the middle sprocket 46 causes the one way clutch 47 to engage the middle sprocket 46. The engagement of the clutch 47 causes the clutch 47 and transverse rod 32 to rotate in a counterclockwise direction. The rotation of the transverse rod 32 will bring the brake cams 48A, 48B into contact with the rear wheels 62A, 62B. This position of brake cam 48A is shown by the broken circle in FIG. 9. Friction between the brake cam 48A and the wheel 62A will cause the rotation of the wheel to slow down.

In order to slow the motive vehicle 10, it is ideal for the brake cam 48A to remain in contact with the wheel 62A. However, if an operator continues to pedal backwards, the transverse rod 32 and the brake cam 48A will continue to rotate, eventually causing the brake cam 48A to lose contact with the wheel 62A for a period of time. Normally, this would not be a problem, as the brake cam 48A would eventually re-engage the wheel 62A if the operator continued pedaling backwards. However, there are situations where an operator would need to stop quickly. Ideally, the brake cam 48A would remain in contact with the wheel 62A in these situations.

Figure 10:
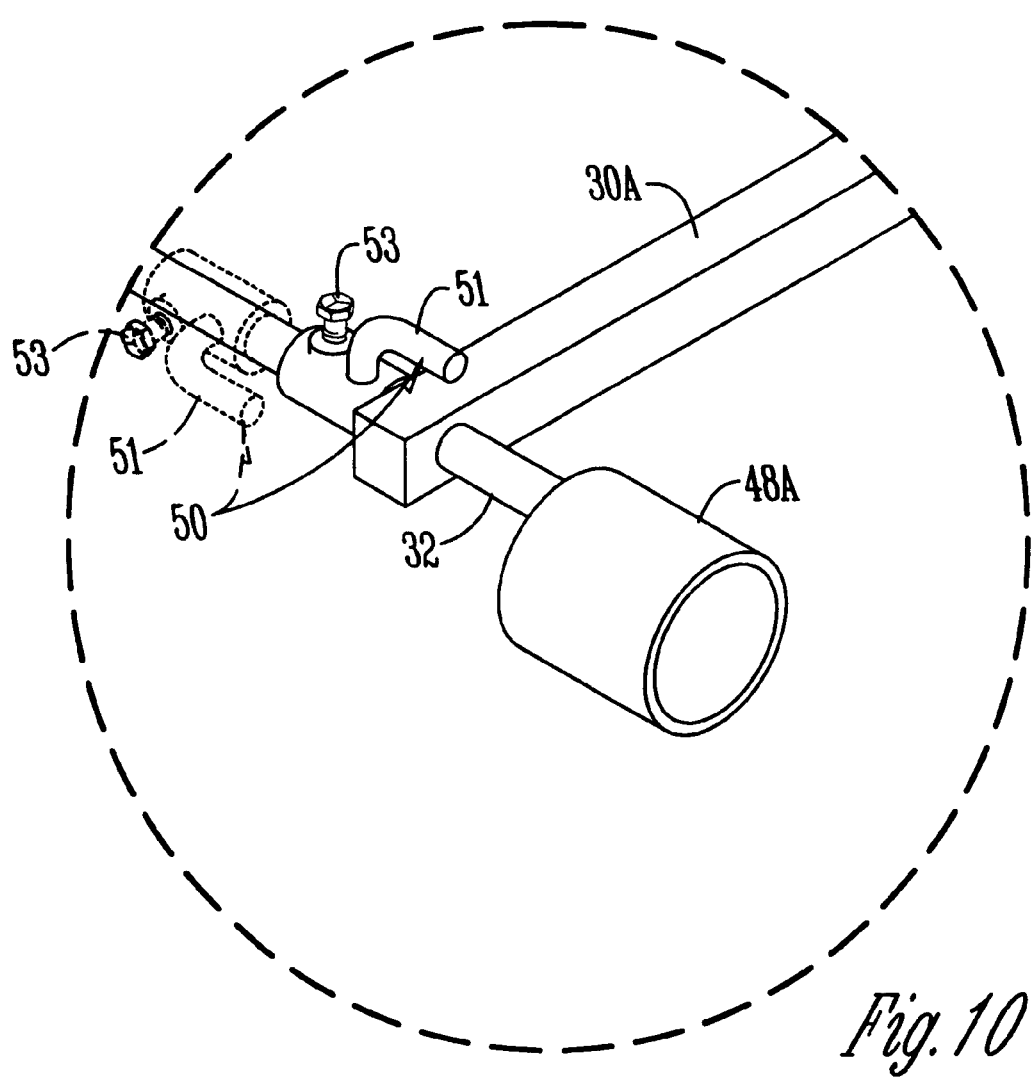
FIG. 10 is an enlarged perspective view, taken along circle 10—10 of FIG. 1, of a brake cam and brake adjustment and lock switch that are utilized in the present invention.

To ensure that the brake cams 48A, 48B contact the wheels 62A, 62B when an operator needs to stop, a safety slide 50, best seen in FIG. 10, is slidably attached to the transverse rod 32. When the slide 50 is in the position shown by the broken lines, it does not have an effect on the operation of the motive vehicle 10. If the safety slide 50 is moved into the position shown in FIG. 10, the operator of the motive vehicle 10 will not be able to pedal backwards once the arm 51 contacts longitudinal bar 30A. The rotation of the transverse rod 32 that results from backwards pedaling causes the arm 51 to rotate until it contacts the longitudinal bar 30A. The safety slide 50 serves to keep the brake cam 48A in contact with the wheel 62A to ensure fast stopping. Screw 53 functions to keep the safety slide 50 from sliding. Safety slide 50 can be rotatably adjusted to maintain the brake cams 48A, 48B in contact with wheels 62A, 62B, or adjusted to increase or decrease the pressure on the wheels 62A, 62B by the cams 48A, 48B. The safety slide So is a useful feature for operators who need to stop quickly, but panic and try to continue pedaling backwards, thinking that doing so will bring the vehicle 10 to a quicker stop.

An alternative embodiment of the motive vehicle is shown in FIGS. 4 and 5. The tandem vehicle 120A comprises a motive vehicle 10, with an attachment bar 124 that is coupled to the transverse bar 24 (FIG. 1), connected to a rear vehicle 10A. The rear vehicle 10A has an attachment bar 126 connected to its pedal device. An attachment member 128 couples the attachment bars 124, 126. The coupling 130 between the attachment bars 124, 126 is a pivotal connection. The rear vehicle 10A is similar to the front vehicle 10, with a few notable differences. The rear vehicle does not have a headset 34, a handle 40, a front wheel 36 or a differential 60. One of the rear vehicle's wheels is coupled to its rear gear and driven by the rear gear. The other rear wheel is not driven. In all other respects, the front and rear vehicles are similar. The tandem vehicle 120B differs from tandem vehicle 120A in that the rear vehicle 10B is a trailer 12B.

In the drawings and specification there has been set forth a preferred embodiment of the invention, and although specific terms are employed, these are used in a generic and descriptive sense only and not for purposes of limitation. Changes in the form and proportion of parts as well as in the substitution of equivalents are contemplated as circumstances may suggest or render expedient without departing from the spirit or scope of the invention as further defined in the following claims.

I claim:

1. A motive device comprising:

at least two central frames, each having a seat mounted thereon and a pair of rear wheels mounted for rotational movement with respect to the central frame, the first frame having a front steering wheel, the steering wheel having a handle mounted thereto; pedals operatively mounted to each frame for receiving motive power from a user and a chain for transmitting motive power from the pedals to the rear wheels;

a differential located between each pair of rear wheels, the differential comprising a housing, at least one idler gear mounted rotatably to the housing, a drive gear operatively connected to the chain and the first rear wheel, and a driven gear operatively connected between the drive gear and the second rear wheel;

whereby the first frame is pivotally mounted in series with the second frame.

2. The motive device of claim 1 wherein said rear wheels are detachably mounted.

3. The motive device of claim 1, wherein the seat is detachably mounted.

4. The motive device of claim 3 wherein the seat is adjustable.

5. The motive device of claim 4 wherein the user can alter the distance between the pedals and the seat.

6. The motive device of claim 1 further comprising an attachment bar mounted at a rearward location on the first frame for coupling to another frame.

7. The motive device of claim 6 further comprising a tandem frame attached to the attachment bar, the tandem frame having a seat mounted thereon, and a pair of rear wheels mounted for rotational movement with respect to the tandem frame.

* * * * *